United States Patent [19]
Brown

[11] Patent Number: 5,400,238
[45] Date of Patent: Mar. 21, 1995

[54] SATURABLE CORE REACTOR RESPONSIVE TO SHORT CIRCUIT CONDITIONS IN A RECTIFIER CIRCUIT

[75] Inventor: Stuart C. Brown, Lima, Ohio

[73] Assignee: Sundstrand Corporation, Rockford, Ill.

[21] Appl. No.: 33,704

[22] Filed: Mar. 16, 1993

[51] Int. Cl.⁶ ............................................. H02H 7/125
[52] U.S. Cl. ........................................ 363/53; 363/92
[58] Field of Search ................. 363/52, 53, 54, 90–93; 361/58, 92; 323/249, 250, 251, 253

[56] References Cited

U.S. PATENT DOCUMENTS

| | | |
|---|---|---|
| 3,117,271 | 1/1964 | Timmermans et al. |
| 3,122,694 | 2/1964 | Muchnick et al. |
| 3,219,918 | 11/1965 | Trench ............................... 323/253 |
| 4,031,457 | 6/1977 | Oberbeck. |
| 4,152,637 | 5/1979 | Oberbeck et al. ................... 323/250 |

FOREIGN PATENT DOCUMENTS

| | | | |
|---|---|---|---|
| 1094895 | 12/1960 | Germany | 363/53 |
| 0638711 | 4/1962 | Italy | 363/91 |
| 53-37821 | 4/1978 | Japan | 363/91 |

*Primary Examiner*—Jeffrey L. Sterrett
*Attorney, Agent, or Firm*—Michael S. Yatsko

[57] ABSTRACT

A short circuit current limiting reactor is disclosed having a series pass inductor wound on a core. A saturation control circuit is employed to control the magnetic saturation of the core. Under normal operating conditions, the core is in magnetic saturation thus making the reactance of the inductor negligible and allowing an AC current to flow freely through the inductor. Upon the occurrence of a short circuit fault, the saturation control circuit brings the core out of its magnetically saturated state thereby causing the reactance of the inductor to rise and limiting the amount of current flowing through the inductor.

5 Claims, 3 Drawing Sheets

SATURABLE CORE REACTOR RESPONSIVE TO SHORT CIRCUIT CONDITIONS IN A RECTIFIER CIRCUIT

FIELD OF THE INVENTION

The present invention relates to the short circuit protection of a power source. More specifically, the present invention is directed to a short circuit limiting reactor for limiting the AC current supplied from an AC source when the load experiences a short circuit fault.

BACKGROUND OF THE INVENTION

In many instances, the design constraints imposed on a power system prevent the utilization of conventional short circuit protection devices such as fuses, circuit breakers, etc. For example, harsh environmental conditions or inaccessible locations on aircraft or other military vehicles, or certain critical loads specified to be non-break, may preclude the use of such conventional short circuit protection devices. The power system is therefore left unprotected from short circuit faults.

SUMMARY OF THE INVENTION

It is an object of the invention to provide a short circuit protection apparatus which may be employed as an alternative to conventional short circuit protection devices. It is a further object of the invention to provide a short circuit protection apparatus which is highly reliable and capable of withstanding adverse environmental conditions.

A short circuit limiting reactor is described for protecting an AC power source from short circuit faults of a load. The apparatus includes an inductor having a core. The inductor is connected as a series pass device between the AC power source and the load. A means for controlling the saturation of the core of the inductor is also provided. The means for controlling causes the core to become magnetically saturated during normal load conditions to allow current to freely flow through said inductor. Upon the occurrence of a short circuit fault of the load, the means for controlling reduces the magnetization of the core to a level below saturation. When the core magnetization falls below saturation, the reactance of the inductor increases thereby limiting the amount of AC current flowing from the AC power source through the inductor.

BRIEF DESCRIPTION OF THE DRAWINGS

Other objects and features of the present invention may be further understood by reference to the following detailed description of the preferred embodiments of the invention taken in conjunction with the accompanying drawings, on which.

It will be understood that the drawings are not necessarily to scale. In certain instances, details which are not necessary for understanding various aspects of the present invention have been omitted for clarity.

DESCRIPTION OF THE PREFERRED EMBODIMENTS

Figure 1:
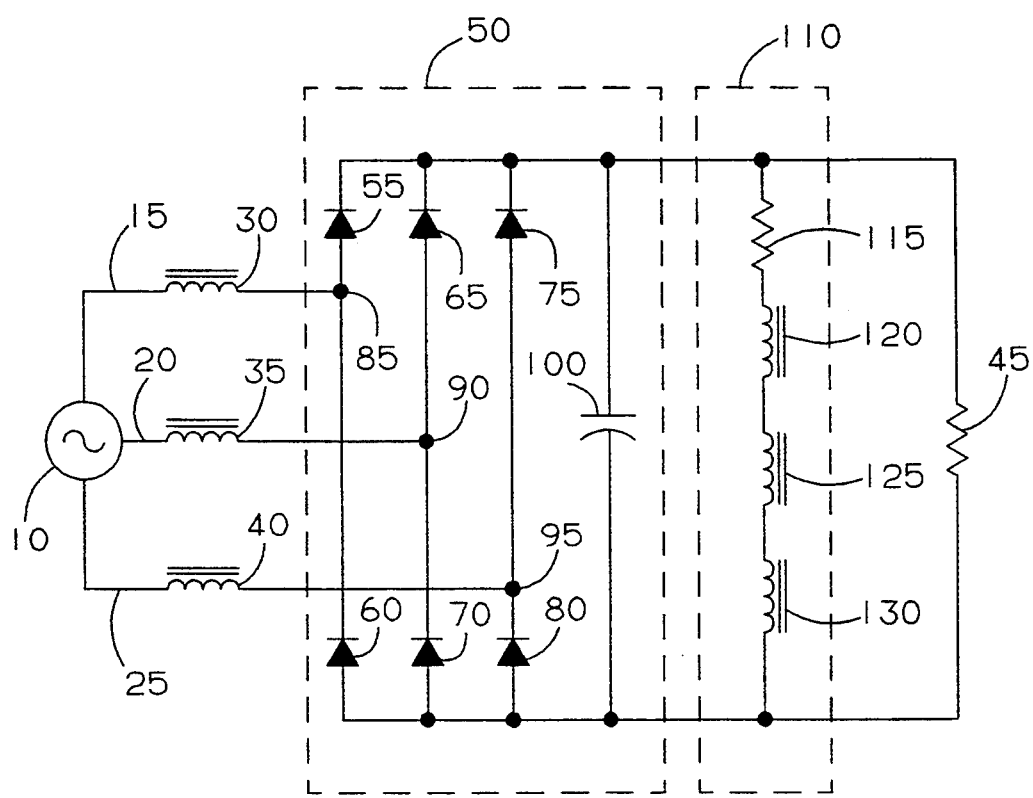
FIG. 1 is a schematic diagram of an embodiment of the invention as employed in an AC to DC power system.

FIG. 1 shows one embodiment of the present invention as implemented in an AC to DC power system. As illustrated, the system includes a three phase AC power source 10 having a first phase output 15, a second phase output 20, and a third phase output 25. A first inductor 30 is connected to the first phase output 15 of the AC power source 10. A second inductor 35 is connected to the second phase output 20 of the AC power source 10. A third inductor 40 is connected to the third phase output 25 of the AC power source 10. Each of the first, second, and third inductors is connected as a series pass device to ultimately pass power from the AC power source 10 to a load 45.

Before being supplied to the load 45, the AC power passing through the inductors 30, 35, 40 is first rectified by a rectifier circuit shown generally at 50. The rectifier circuit 50 includes a first pair of diodes 55, 60, a second pair of diodes 65, 70, and a third pair of diodes 75, 80. The anode of the first diode 55 is connected to the cathode of the second diode 60 at node 85. The first inductor 30 is connected between the first phase output 15 and node 85. The anode of the third diode 55 is connected to the cathode of the fourth diode 60 at node 90. The second inductor 35 is connected between the second phase output 20 and node 90. The anode of the fifth diode 75 is connected to the cathode of the sixth diode 80 at node 95. The third inductor 40 is connected between the third phase output 25 and node 95. The first, second, and third pairs of diodes are connected in parallel with one another. A filter, such as capacitor 100, is likewise connected in parallel with the diode pairs to filter the ripple component of the rectified AC power.

A saturation control circuit, shown generally at 110, is connected in parallel with the load 45. The saturation control circuit of the illustrated embodiment includes a current limiting resistor 115, a fourth inductor 120, a fifth inductor 125, and a sixth inductor 130. The resistor 115 and inductors 120, 125, 130 are connected in series with one another.

Figure 2:
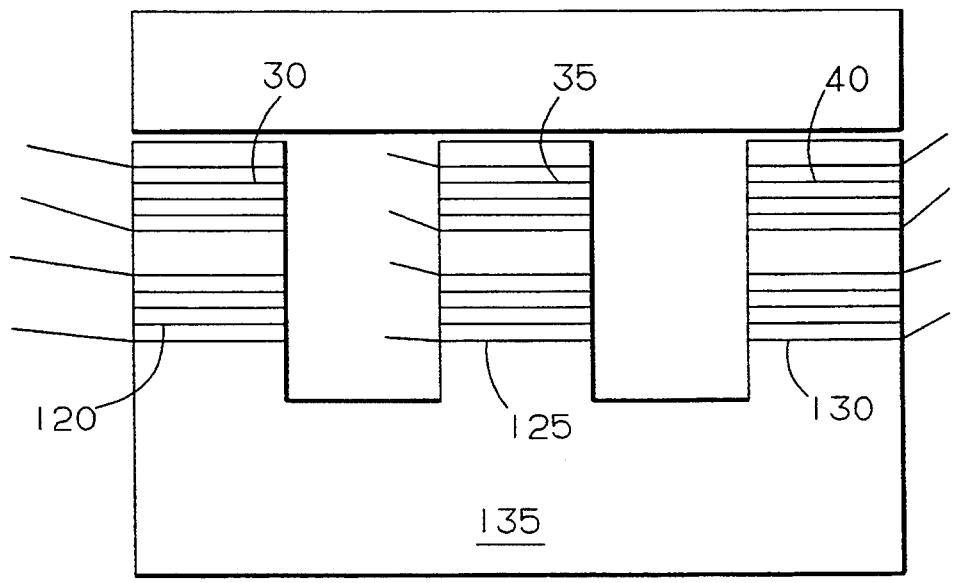
FIG. 2 illustrates one embodiment of the inductors used in the embodiment of FIG. 1.

FIG. 2 illustrates one configuration for the inductors of the embodiment shown in FIG. 1. As shown, the configuration includes an E-I shaped core 135 which, for example, may be an iron core. The first and fourth inductors 30, 120 are wound on an outer leg of the core 135. The second and fifth inductors 35, 125 are wound on the middle leg of the core 135. The third and sixth inductors 40, 130 are wound on the remaining leg of the core 135.

Although the inductors of FIG. 2 are shown as being wound on a common E-I shaped core, other configurations may also be employed. For example, three separate cores may be employed in the three phase system illustrated in FIG. 1, each core respectively associated with a single phase output of the AC power source. In such a configuration, the first and fourth inductors 30, 120 are wound on a first core, the second and fifth inductors 35, 125 are wound on a second core, and the third and sixth inductors 40, 130 are wound on a third core. If a single phase AC system is employed, only one core and corresponding pair of inductors need be employed.

During normal operation of the power system, the resistance of the load 45 is within the operational range of the system. Current flows through the current limiting resistor 115 and inductors 120, 125, 130. The resistance of the current limiting resistor 115 and the values of inductors 120, 125, 130 are chosen so that the respective legs of the E-I shaped core 135 are magnetically saturated when the load 45 is in its normal operating range. With the core in magnetic saturation, the reactance values of the respective inductors 30, 35, 40 are negligible thereby allowing current to flow freely through the inductors 30, 35, 40 and ultimately to the load 45.

Upon the occurrence of a short circuit fault at the load 45, the voltage across the load 45 drops below a threshold value. Less current flows through the resistor 115 and inductors 120, 125, 130. At some point, the current flowing through the saturation control circuit 110 becomes less than the current required to maintain the magnetic saturation of the core. Once the core is no longer magnetically saturated, the reactance values of the inductors 30, 35, 40 become significant thereby limiting the amount of current flowing through the inductors 30, 35, 40 and ultimately to the load 45.

Figure 3:
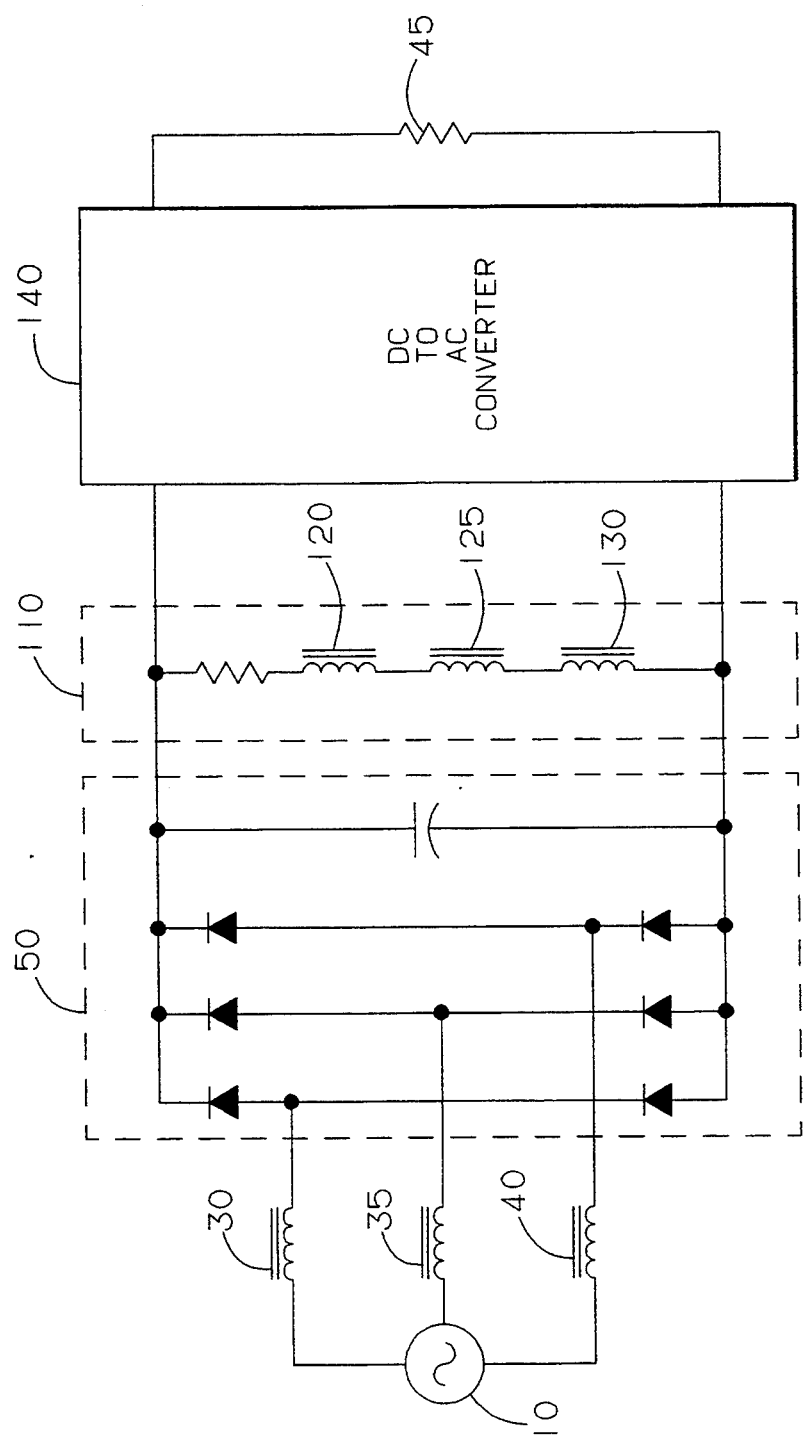
FIG. 3 is a schematic diagram of an embodiment of the invention as employed in an AC to AC power system.

FIG. 3 illustrates an embodiment of the present invention as employed in an AC to AC power supply system. As in the embodiment of FIG. 1, the system includes an AC power source 10, three series pass inductors 30, 35, 40, a rectifier circuit 50, and a saturation control circuit 110. Unlike the embodiment shown in FIG. 1, the system further includes a DC to AC converter that is connected between the saturation control circuit and the load. Together, the effective load comprises the DC to AC converter and the load 45. The DC to AC converter is of a conventional design and may be a single phase or multi-phase design that is readily constructed by those of ordinary skill in the art.

The embodiment of FIG. 3 operates in a similar manner to the embodiment of FIG. 1. During normal operation of the power system, the effective resistance of the load 45 and converter 140 is within the operational range of the system. The cores of the respective inductor pairs (30, 120; 35, 125; 40, 130) are in magnetic saturation and the reactance values of the inductors 30, 35, and 40 are negligible. Upon the occurrence of a short circuit fault at the load 45 or in the DC to AC converter 140, the voltage across the saturation control circuit 110 drops below a threshold value. Less current flows through the resistor 115 and inductors 120, 125, 130. At some point, the current flowing through the saturation control circuit becomes less than the current required to maintain the magnetic saturation of the cores. Once the cores are no longer magnetically saturated, the reactance values of the inductors 30, 35, 40 become significant thereby limiting the amount of current flowing through the inductors 30, 35, 40 and ultimately to the DC to AC converter 140 and load 45.

The foregoing embodiments of the invention may be utilized in systems in which the design constraints prevent the use of conventional circuit protection devices. Since current control occurs automatically, there are no fuses to replace or breakers to reset thus making the invention applicable in system designs having space constraints. Additionally, since the embodiments of the invention rely on electromagnetism for their operation, there are no moving parts thus making the embodiments particularly resistant to failures due to harsh environmental and high temperature conditions.

While several embodiments of the invention have been described hereinabove, those of ordinary skill in the art will recognize that the embodiments may be modified and altered without departing from the central spirit and scope of the invention. Thus, the preferred embodiments are to be considered in all respects as illustrative and not restrictive, the scope of the invention being indicated by the appended claims rather than by the foregoing description. It is therefore the intention of the inventor to embrace herein all changes and modifications which come within the meaning and range of equivalency of the claims.

What is claimed:

1. A three phase AC power system comprising:
   a three phase AC power source;
   means for rectifying power received from said AC power source for ultimate supply to a load;
   first, second, and third inductors wound on a common core, said first inductor being connected as a series pass device between a first phase output from said AC power source and a first input to said means for rectifying, said second inductor being connected as a series pass device between a second phase output from said AC power source and a second input to said means for rectifying, said third inductor being connected as a series pass device between a third phase output from said AC power source and a third input to said means for rectifying, said common core being an E-I shaped core with each of said first, second, and third inductors being wound on respective legs of said E-I shaped core;
   means for controlling the saturation of said common core, said means for controlling causing magnetic saturation of said core during normal load conditions to allow current to freely flow through said first, second, and third inductors, said means for controlling causing a reduction of the magnetization of said common core below saturation upon the occurrence of a short circuit fault of said load to increase the reactance of said first, second, and third inductors and limit the amount of AC current flowing from said AC power source through said first second and third inductors.

2. A three phase AC power system as claimed in claim 1 wherein said means for rectifying comprises:
   first and second series connected diodes, said first and second diodes being connected in parallel with said load, the anode of said first diode being connected to the cathode of said second diode at a first junction, said first junction constituting said first input of said means for rectifying;
   third and fourth series connected diodes, said third and fourth diodes being connected in parallel with said load, the anode of said third diode being connected to the cathode of said fourth diode at a second junction, said second junction constituting said second input of said means for rectifying;
   fifth and sixth series connected diodes, said fifth and sixth diodes being connected in parallel with said load, the anode of said fifth diode being connected to the cathode of said sixth diode at a third junction, said third junction constituting said third input of said means for rectifying.

3. A three phase AC power system as claimed in claim 1 wherein said means is an iron core.

4. A three phase power system as claimed in claim 1 wherein said means for controlling comprises:
   a fourth inductor wound on the same leg of said E-I shaped core as said first inductor;

a fifth inductor wound on the same leg of said E-I shaped core as said second inductor;

a sixth inductor wound on the same leg of said E-I shaped core as said third inductor, said fourth, fifth, and sixth inductors being connected electrically in series;

a current limiting resistor connected in series with said fourth, fifth, and sixth inductors, said current limiting resistor and said fourth, fifth, and sixth inductors being connected in parallel with the output of said means for rectifying.

5. A three phase power system as claimed in claim 1 wherein said means for controlling comprises:

at least one further inductor wound on said common core;

a current limiting resistor connected in series with said at least one further inductor, said current limiting resistor and said at least one further inductor connected in parallel with the output of said means for rectifying.

* * * * *